(12) United States Patent
Ohba et al.

(10) Patent No.: US 8,170,635 B2
(45) Date of Patent: May 1, 2012

(54) RADIO APPARATUS AND ANTENNA DEVICE FOR MOBILE RADIO SYSTEM

(75) Inventors: Isao Ohba, Tokyo (JP); Koichi Sato, Tokyo (JP); Hisashi Higashigawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 400 days.

(21) Appl. No.: 12/471,611

(22) Filed: May 26, 2009

(65) Prior Publication Data

US 2010/0081489 A1    Apr. 1, 2010

(30) Foreign Application Priority Data

Sep. 26, 2008    (JP) ................. 2008-248960

(51) Int. Cl.
*H04M 1/00*    (2006.01)
*H01Q 1/24*    (2006.01)
(52) U.S. Cl. .............. 455/575.7; 455/575.3; 343/702
(58) Field of Classification Search .......... 455/575.7, 455/575.3; 343/702
See application file for complete search history.

(56) References Cited

U.S. PATENT DOCUMENTS
2007/0164913 A1*    7/2007    Sakamoto et al. ........... 343/702

FOREIGN PATENT DOCUMENTS
JP    2007-088692 A    4/2007
* cited by examiner

*Primary Examiner* — Kamran Afshar
*Assistant Examiner* — Omoniyi Obayanju
(74) *Attorney, Agent, or Firm* — Holtz, Holtz, Goodman & Chick, PC

(57) ABSTRACT

A radio apparatus including a first housing section, a second housing section and a hinge section is provided. The second housing section is rotatably connected to the first housing section. The second housing section includes an antenna feed circuit and a ground circuit. The hinge section is constituted by an axis member fixed to the second housing section and a bearing member fixed to the first housing section. The axis member is put through the bearing member for forming an axis of rotation of the second housing section with respect to the first housing section. The axis member has a conductive portion connected to the antenna feed circuit at a feed point.

18 Claims, 6 Drawing Sheets

RADIO APPARATUS AND ANTENNA DEVICE FOR MOBILE RADIO SYSTEM

CROSS REFERENCE TO RELATED APPLICATIONS

This application is based upon and claims the benefit of priority from the prior Japanese Patent Application No. 2008-248960 filed on Sep. 26, 2008; the entire contents of which are incorporated herein by reference.

BACKGROUND OF THE INVENTION

1. Field of the Invention

The present invention relates to a radio apparatus and an antenna device for a mobile radio system, and in particular to a radio apparatus having a plurality of housing sections and an antenna device adapted for such a radio apparatus.

2. Description of the Related Art

Most of radio apparatuses such as mobile phones in recent years have a configuration in which two housing sections are movably connected in such a way as to be open and closed to each other, so as to meet the requirement for multiple functions and high performance and the requirement for downsizing and thinning at the same time. The radio apparatus connects the two housing sections by using a flip type structure, a flip type structure with a two-axis hinge (may be called a swivel type) or a slide type structure. The above flip type structure and the swivel type structure has a hinge section and the two housing sections are rotatably connected to each other through the hinge section.

Meanwhile, most of antenna devices of radio apparatuses such as mobile phones are of a built-in type in the housing rather than a type to be extended out of the housing and used such as a whip antenna. The radio apparatus can raise an aesthetic or operational aspect by using such a built-in type antenna device. As described above, however, the radio apparatus is required to have multiple functions and high performance and to be downsized and thinned at the same time. Thus, the antenna device is required to give necessary performance while being arranged in limited space inside the housing.

In order to meet the above requirement, a mobile radio apparatus is constituted by including an antenna in a hinge section as disclosed in Japanese Patent Publication of Unexamined Applications (Kokai), No. 2007-88692. The mobile radio apparatus of JP 2007-88692 is constituted by a first housing section and a second housing section rotatably connected to each other through a hinge section. A hinge core forming a hinge axis is arranged in the hinge section.

According to JP 2007-88692, the above hinge core is constituted by including a first member and a second member connected to each other. The first member is mechanically fixed to the second housing section and electrically connected to a circuit board included in the second housing section. The second member is mechanically fixed to the first housing section but not electrically connected to a circuit board included in the first housing section. The first member is made of conductive material such as metal and is shaped to be almost cylindrical or columnar, and so is the second member. Due to the above configuration, the hinge core can be fed from the circuit board included in the second housing section as an antenna element while not being electrically connected to the circuit board included in the first housing section.

In the mobile radio apparatus of JP 2007-88692, the whole hinge core forming the hinge axis is constituted by the conductive members and is fed as the antenna element. According to the paragraph "0026" of the specification of JP 2007-88692, the hinge core is constituted by the conductive members such as metal and is shaped to be almost cylindrical or columnar. The first member and the second member are on the side of the second housing section and on the side of the first housing section, respectively, and are mechanically connected to each other in such a way as to rotate coaxially. The hinge core includes a mechanism configured to provide retention force for a click feeling, and a mechanism configured to provide rotation force for an unaided rotation.

A spring may be arranged in an axial direction of the rotation so as to give rotational resistance, as an example of the above "mechanism configured to provide rotation force for an unaided rotation". In general, the spring is made of metal and is conductive, and may thereby affect an antenna characteristic upon changing its shape depending upon an open/closed state determined by the rotation between the two housing sections (e.g., an angle between the two housing sections of the flip type mobile phone). As the open/closed state usually changes in accordance with the purpose of use of the radio apparatus, it is not preferable for the antenna characteristic to be affected as described above.

SUMMARY OF THE INVENTION

Accordingly, an advantage of the present invention is to provide an antenna device constituted by using members of a hinge section connecting two housing sections, and having a characteristic not to be easily affected by the open/closed state determine by the rotation between the two housing sections.

To achieve the above advantage, one aspect of the present invention is to provide a radio apparatus including a first housing section, a second housing section and a hinge section. The second housing section is rotatably connected to the first housing section. The second housing section includes an antenna feed circuit and a ground circuit. The hinge section is constituted by an axis member fixed to the second housing section and a bearing member fixed to the first housing section. The axis member is put through the bearing member for forming an axis of rotation of the second housing section with respect to the first housing section. The axis member has a conductive portion connected to the antenna feed circuit at a feed point.

DETAILED DESCRIPTION OF THE INVENTION

Figure 1:
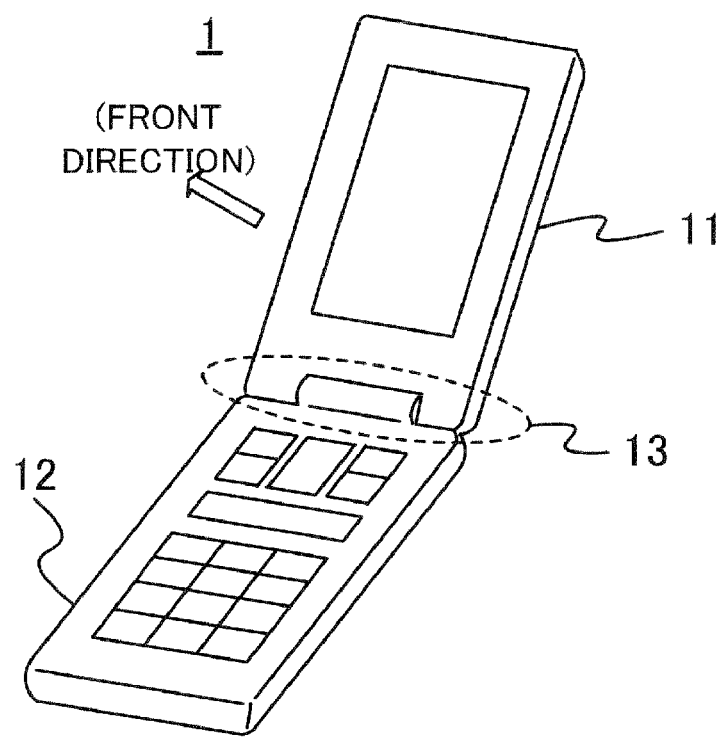
FIG. 1 is a perspective view showing a configuration of a mobile communication terminal, i.e., a radio apparatus of a first embodiment of the present invention.

Hereinafter, embodiments of the present invention will be described in detail. In following descriptions, terms such as upper, lower, left, right, horizontal or vertical used while referring to a drawing shall be interpreted on a page of the drawing unless otherwise noted. A same reference numeral given in no less than two drawings shall represent a same member or a same portion.

A first embodiment of the present invention will be described with reference to FIGS. 1-11. FIG. 1 is a perspective view showing a configuration of a mobile communication terminal 1, i.e., a radio apparatus of the first embodiment of the present invention. The mobile communication terminal 1 is constituted by a first housing section 11 and a second housing section 12 rotatably connected through a hinge section 13 in such a way as to be open and closed to each other. An upper left side shown in FIG. 1 corresponds to a front direction of the mobile communication terminal 1 being in use.

A mechanism that enables the first housing section 11 and the second housing section 12 to be open and closed to each other may be of a flip type or a two-axis hinge (swivel) type, and is not limited to those types. The hinge section 13 is a portion including the mechanism that is placed between the first housing section 11 and the second housing section 12 and enables the first housing section 11 and the second housing section 12 to be open and closed to each other. The hinge section 13 is indicated by a dashed ellipse surrounding it in FIG. 1.

A display unit constituted by, e.g., a liquid crystal device is arranged on a front face of the first housing section 11 (another display unit may be arranged on other faces including backs of the first housing section 11 and the second housing section 12). An operation section constituted by a plurality of operation keys is arranged on a front face of the second housing section 12 (some of the operation keys may be arranged on other faces including side faces of the first housing section 11 and the second housing section 12).

Figure 2:
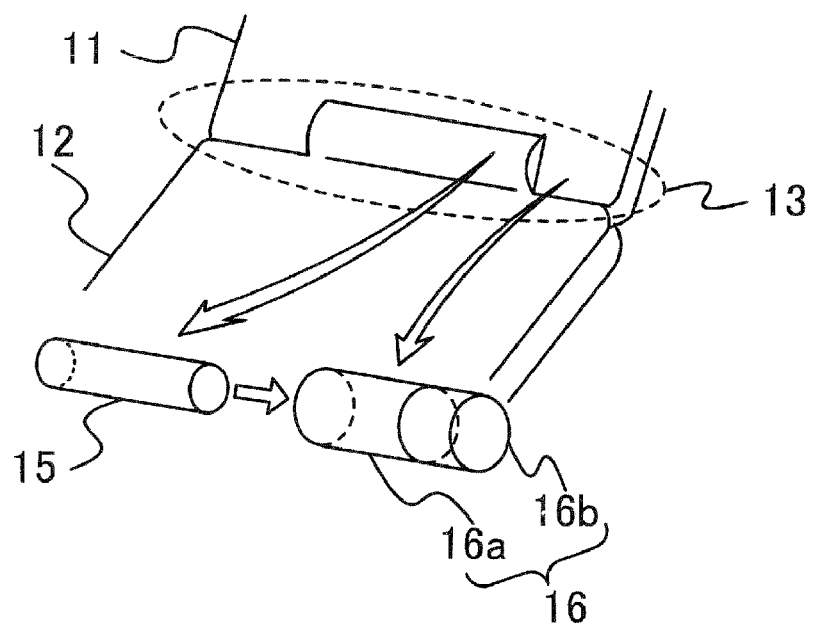
FIG. 2 illustrates a configuration of a hinge section of the mobile communication terminal of the first embodiment.

FIG. 2 illustrates a configuration of the hinge section 13. As shown by a curved block arrow in FIG. 2, a portion of the hinge section 13 on the side of the second housing section 12 accommodates an axis member 15. The axis member 15 is, e.g., made of metallic material shaped like a shaft. The axis member 15 may have one portion made of metallic material and another portion made of nonconductive material. As shown by another curved block arrow in FIG. 2, a portion of the hinge section 13 on the side of the first housing section 11 accommodates a bearing member 16. The bearing member 16 is constituted by a cover section 16a and a head section 16b.

Figure 3:
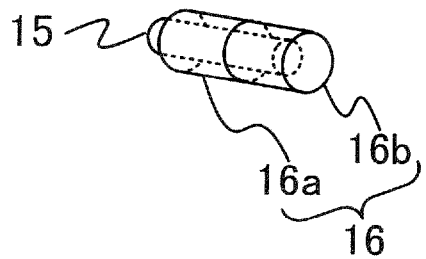
FIG. 3 illustrates a mechanical relationship between an axis member and a bearing member both constituting the hinge section of the mobile communication terminal of the first embodiment.

The axis member 15 is, as shown by a block arrow directed to the bearing member 16, put through the bearing member 16 that is shaped like a hollow cylinder. FIG. 3 illustrates a mechanical relationship between the axis member 15 and the bearing member 16, i.e., a state in which the axis member 15 is put through the bearing member 16. The axis member 15 is mechanically fixed to the second housing section 12. The bearing member 16 is mechanically fixed to the first housing section 11. Due to such a structure, the second housing section 12 can rotate with respect to the first housing section 11 around an axis formed by the axis member 15.

Figure 4:
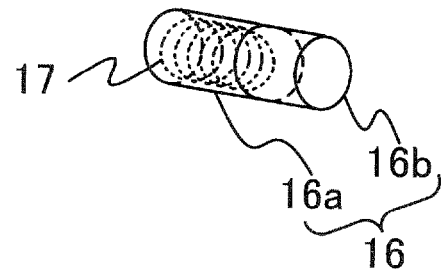
FIG. 4 illustrates a state in which a spring is arranged on an inner wall of the bearing member of the first embodiment.

As shown in FIG. 4, a spring 17 (indicated by a spiral dotted line, omitted to be shown in FIGS. 2-3 for avoiding complicated drawings) is arranged on an inner wall of the hollow cylinder of the cover section 16a. The spring 17 gives rotational resistance upon the second housing section 12 rotating with respect to the first housing section 11 as described above. When the first housing section 11 and the second housing section 12 are closed to each other, the spring 17 can thereby provide a moderate resistance feeling. When the first housing section 11 and the second housing section 12 open to each other, the spring 17 can thereby provide a feeling as if the first housing section 11 and the second housing section 12 open by themselves to a certain extent. The cover section 16a may have a mechanism that can give a moderate click feeling while the first housing section 11 and the second housing section 12 are being open and closed to each other.

Figure 5:
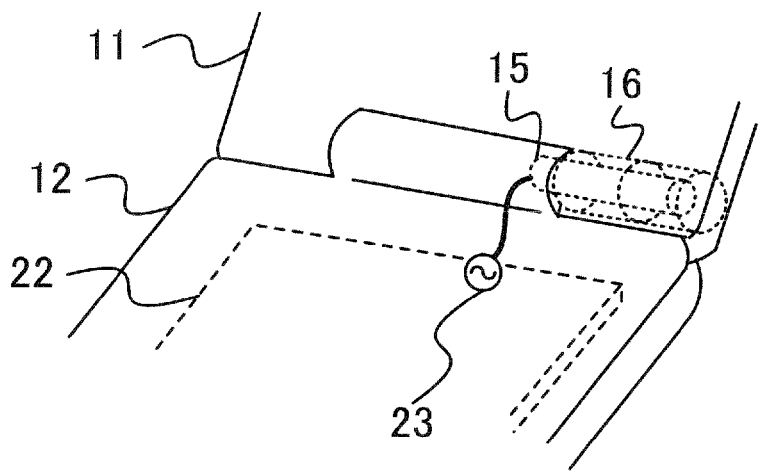
FIG. 5 illustrates an electrical connection of the axis member of the first embodiment.

FIG. 5 illustrates an electrical connection of the axis member 15. As described with reference to FIG. 2, the bearing member 16 is arranged inside the portion of the hinge section 13 on the side of the first housing section 11 (the bearing member 16 is shown by dotted lines in FIG. 5), and is mechanically fixed to the first housing section 11. The axis member 15 is arranged inside the portion of the hinge section 13 on the side of the second housing section 12 (the axis member 15 is shown by dotted lines in FIG. 5), and is mechanically fixed to the second housing section 12.

The first housing section 11 and the second housing section 12 includes a first printed board (not shown in FIG. 5) and a second printed board 22 (shown by dashed lines in FIG. 5), respectively. The second printed board 22 has an antenna feed circuit 23 indicated by a symbol, and a ground circuit (a conductive portion to be grounded) that is not shown. The axis member 15 made of the metallic material is connected to the antenna feed circuit 23 and can be excited as an antenna element so as to constitute an antenna device of the mobile communication terminal 1.

The mobile communication terminal 1 or its antenna device configured as described above has following effects. At first, as shown in FIG. 5, the mobile communication terminal 1 having the antenna device that uses the axis member 15 as the antenna element arranged close to a right end of the hinge section 13 can arrange, e.g., another antenna device in space on a left side of the hinge section 13, and can thereby use mounting space efficiently.

Next, the axis member 15 that can be excited as the antenna element is mechanically fixed to the second housing section 12, and thus never changes its shape even if the second housing section 12 rotates with respect to the first housing section 11 so as to obtain a stable antenna characteristic.

Still, the length of the axis member 15 in the direction of the axis of the rotation can be selected within a certain range regardless of the size of the bearing member 16 (the axis member 15, e.g., can be extended leftward in FIG. 5, i.e., at least a portion of the axis member 15 is exposed to the outside of the bearing member 16). The mobile communication terminal 1 can thereby select a resonant frequency of the antenna element within a certain range without upsizing the hinge section 13.

Figure 6:
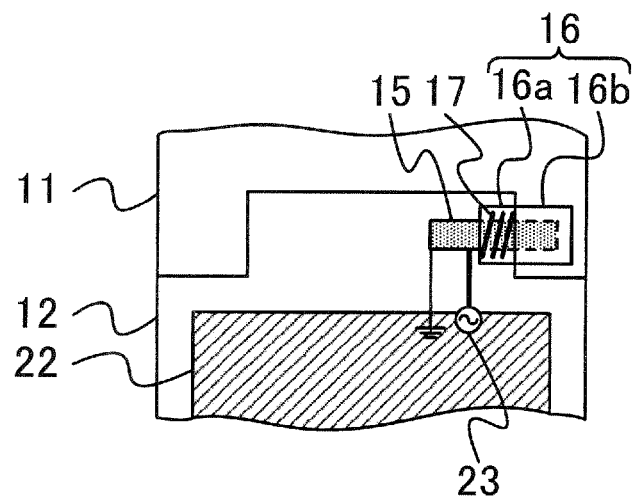
FIG. 6 illustrates an electrical connection of an exposed portion of an axis member of a first modification of the first embodiment.

As at least a portion of the axis member 15 is exposed to the outside of the bearing member 16, as described above, the connection or the shape of the exposed portion can be modified in a couple of ways. FIG. 6 illustrates an electrical connection of a first one of such modifications as viewed from the front direction of the mobile communication terminal 1 in FIG. 1, FIG. 2 or FIG. 5 while the mobile communication terminal 1 is being in use. Each of portions shown in FIG. 6 which is a same as the corresponding one shown in FIGS. 2-5 is given a same reference numeral, and its explanation is omitted.

As shown in FIG. 6, the portion of the axis member 15 exposed to the outside of the bearing member 16 is connected to the antenna feed circuit 23 at a feed point, and is short-circuited to the grounded conductive portion of the second printed board 22 that is not shown at another point. The axis member 15 constitutes a so-called inverted-F antenna due to such a connection and can adjust impedance as viewed from the antenna feed circuit 23.

Figure 7:
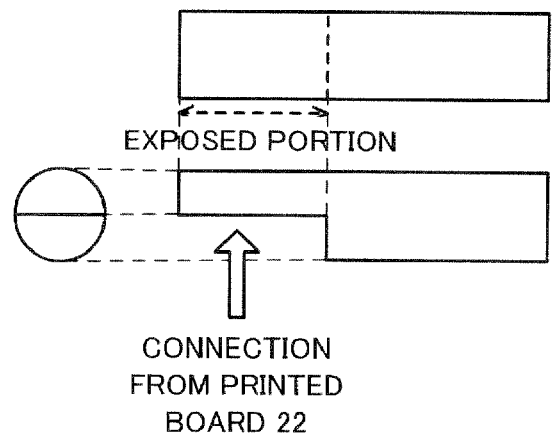
FIG. 7 is a three-side view showing a shape of an axis member of a second modification of the first embodiment.

FIG. 7 is a three-side view showing a shape of the axis member 15 of a second modification of the first embodiment. The lower right of the three-side view is a front view as viewed from the upper left in FIG. 1, 2 or 5 (the front direction of the mobile communication terminal 1 being in use). The portion of the axis member 15 exposed to the outside of the bearing member 16 is shown on the left side of the front view in FIG. 3 or 5. The exposed portion of the second modification is shaped to have a half circular cross section.

Owing to the above shape of the axis member 15, as shown by a block arrow in the above front view, e.g., a connection pin can be stood from the lower side (from the second printed board 22) and easily connected to the axis member 15. The portion of the axis member 15 exposed to the outside of the bearing member 16 can be preferably shaped to be connected to the antenna feed circuit 23, e.g., as described above.

Figure 8:
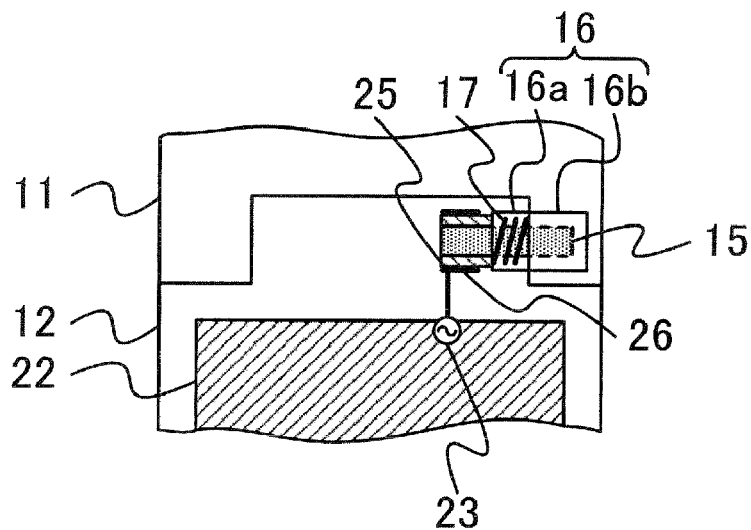
FIG. 8 shows a configuration and an electrical connection of a third modification of the first embodiment.
Figure 9:
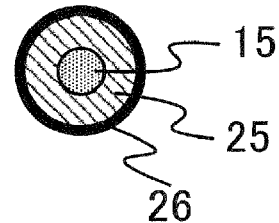
FIG. 9 is a cross-sectional view showing a configuration of the exposed portion of the axis member of the third modification of the first embodiment.

FIG. 8 shows a configuration and an electrical connection of a third modification of the first embodiment as viewed from the same direction as in FIG. 6. Each of portions shown in FIG. 8 which is a same as the corresponding one shown in FIGS. 2-5 is given a same reference numeral, and its explanation is omitted. As shown in FIG. 8, a nonconductive surrounding member 25 is arranged around the portion of the axis member 15 exposed to the outside of the bearing member 16. On an outer face of the nonconductive surrounding member 25, a conductive pattern 26 is arranged by, e.g., being plated. FIG. 9 shows a configuration of the exposed portion of the axis member 15 described above on a cross section that is perpendicular to the page of FIG. 8.

As shown in FIG. 8, the conductive pattern 26 is connected to the antenna feed circuit 23 and is excited as the antenna element so as to constitute the antenna device of the mobile communication terminal 1. As the antenna device configured as described above is separate from the axis member 15 and the bearing member 16 by means of the nonconductive surrounding member 25, the antenna device can be effectively isolated from a change of relative positions of metallic portions caused by the rotation between the axis member 15 and the bearing member 16, and can thereby maintain stability of the antenna characteristic.

Figure 10:
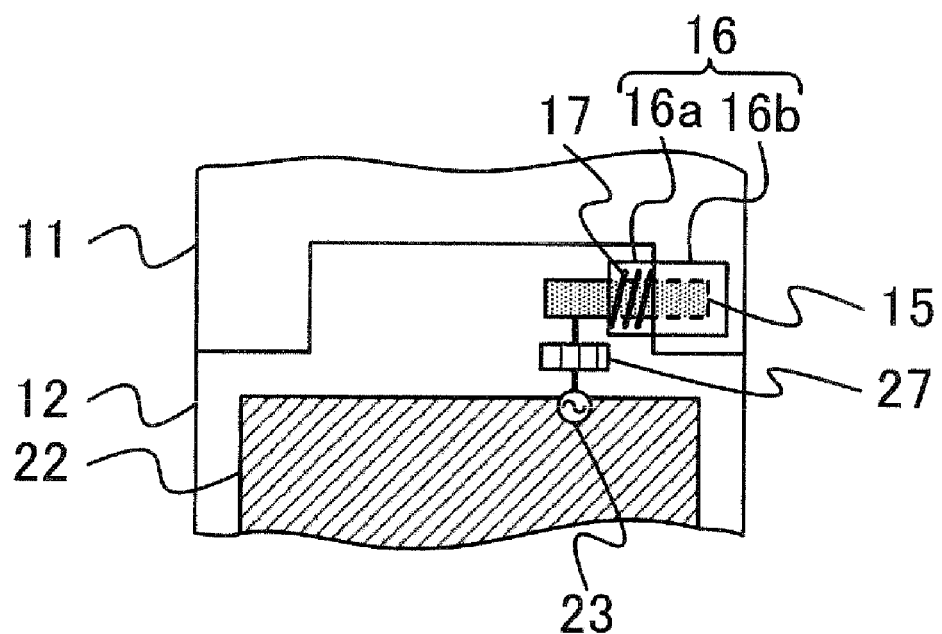
FIG. 10 shows a configuration and an electrical connection of a fourth modification of the first embodiment.

FIG. 10 shows a configuration and an electrical connection of a fourth modification of the first embodiment as viewed from the same direction as in FIG. 6. Each of portions shown in FIG. 10 which is a same as the corresponding one shown in FIGS. 2-5 is given a same reference numeral, and its explanation is omitted. As shown in FIG. 10, a parallel resonance circuit 27 can be arranged between the axis member 15 and the antenna feed circuit 23 as a matching circuit. The parallel resonance circuit 27 can be given a parallel resonant frequency that is different from the resonant frequency of the axis member 15 so that the antenna device can have plural resonant frequencies.

Figure 11:
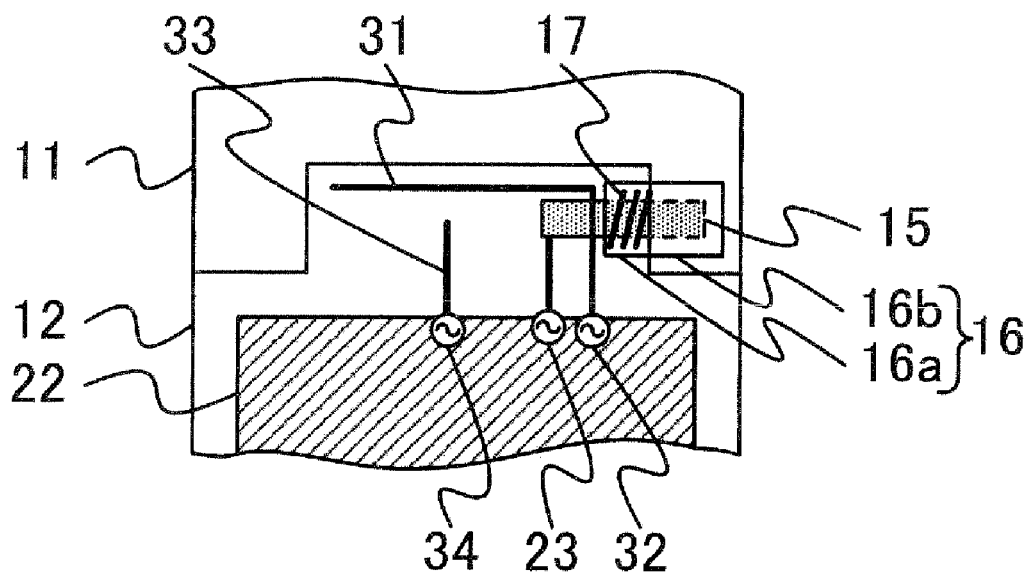
FIG. 11 shows a configuration and an electrical connection of a fifth modification of the first embodiment.

FIG. 11 shows a configuration and an electrical connection of a fifth modification of the first embodiment as viewed from the same direction as in FIG. 6. Each of portions shown in FIG. 11 which is a same as the corresponding one shown in FIGS. 2-5 is given a same reference numeral, and its explanation is omitted. The fifth modification includes an antenna element 31 on the side of the second housing section 12 of the hinge section 13. The antenna element 31 is connected to an antenna feed circuit 32 arranged on the second printed board 22. The fifth modification includes an antenna element 33 on the side of the second housing section 12 of the hinge section 13. The antenna element 33 is connected to an antenna feed circuit 34 arranged on the second printed board 22.

According to the fifth modification described above, the mobile communication terminal 1 can have two antenna devices in addition to the antenna device having the axis member 15 as the antenna element. These antenna devices are contained in the hinge section 13 so as to improve space efficiency and to contribute to multiple functions as antennas of a plurality of systems.

The antenna element constituted by the axis member 15 and the antenna element 31 have inverted-L shapes directed in opposite directions to each other, and the tips of the antenna element constituted by the axis member 15 and the antenna element 31 are arranged perpendicular to the antenna element 33, so that the isolation among the antenna elements can be improved rather than in a case where the antenna elements are directed in a same direction. Various arrangements can improve the isolation, such that the portions of the antenna elements which are being fed at which high voltage values are distributed are arranged separate, that the antenna elements are arranged in such a way that the areas of the portions of the antenna elements facing each other are small, that the antenna elements having resonant or third harmonic frequencies which are close to each other are arranged separate, and that the portions close to a feed end or a portion away from the feed end by an odd number times the quarter wavelength are arrange separate.

According to the first embodiment of the present invention, an axis member of the hinge section of a mobile communication terminal constituted by two housing sections rotatably connected to each other can be used as an antenna element so that the open/closed state caused by the rotation of the housing sections with respect to each other hardly affects the antenna characteristic.

Figure 12:
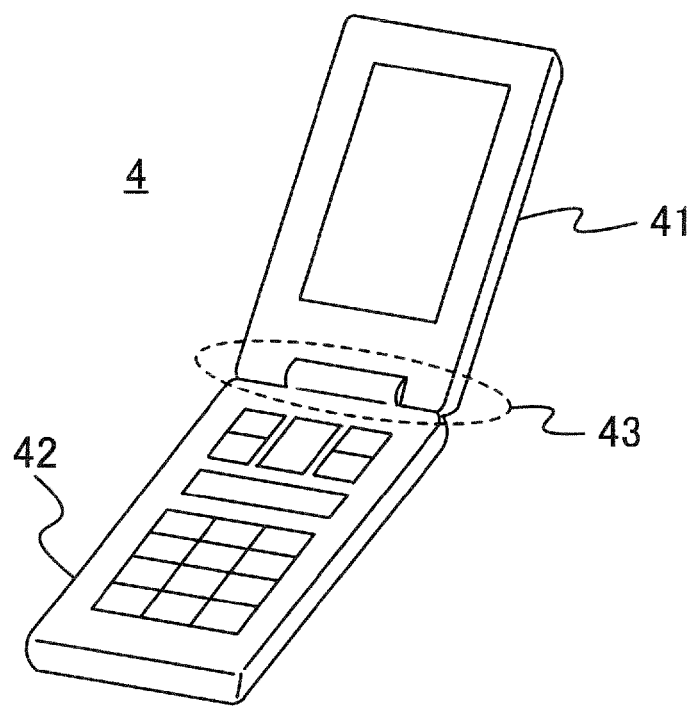
FIG. 12 is a perspective view showing a configuration of a mobile communication terminal, i.e., a radio apparatus of a second embodiment of the present invention.

A second embodiment of the present invention will be described with reference to FIGS. 12-14. FIG. 12 is a perspective view showing a configuration of a mobile communication terminal 4, i.e., a radio apparatus of the second embodiment of the present invention. The mobile communication terminal 4 is constituted by a first housing section first housing section 41 and a second housing section 42 rotatably connected through a hinge section 43 in such a way as to be open and closed to each other. A mechanism that enables the first housing section 41 and the second housing section 42 to be open and closed to each other may be of a flip type or a two-axis hinge (swivel) type, and is not limited to those types.

The hinge section 43 is a portion including the mechanism that is placed between the first housing section 41 and the second housing section 42 and enables the first housing section 41 and the second housing section 42 to be open and closed to each other. The hinge section 43 is indicated by a dashed ellipse surrounding it in FIG. 12. The first housing section 41 and the second housing section 42 have a display unit and an operation section, respectively, on their front faces similarly as the first embodiment.

The hinge section 43 is constituted similarly as the hinge section 13 of the first embodiment, and accommodates the axis member 15 and the bearing member 16 (they are not shown in FIG. 12). The axis member 15 is mechanically fixed to the second housing section 42, and is put through the bearing member 16 that is mechanically fixed to the first housing section 41.

Figure 13:
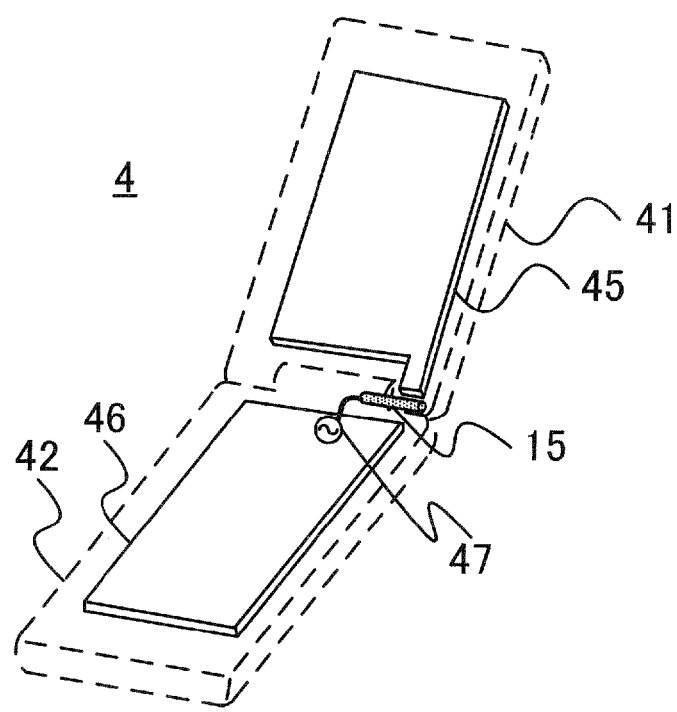
FIG. 13 shows an internal configuration of the mobile communication terminal of the second embodiment.

FIG. 13 shows an internal configuration of the mobile communication terminal 4. In FIG. 13, outlines of the first housing section 41, the second housing section 42 and the hinge section 43 are shown by dashed lines, and the internal configuration is shown by solid lines. The first housing section 41 and the second housing section 42 include a first printed board 45 and a second printed board 46, respectively.

The second printed board 46 has an antenna feed circuit 47 indicated by a symbol and a ground circuit that is not shown. The axis member 15 made of metallic material is connected to the antenna feed circuit 47 and is excited as an antenna element so as to form an antenna device of the mobile communication terminal 4.

As shown in FIG. 13, a lower right area of the first printed board 45 is extended downwards. An area of the first printed board 45 including the extended area has a conductive portion that is not shown. Thus, the conductive portion of the first printed board 45 is arranged in such a way that an end of the conductive portion is close to the axis member 15. If the axis member 15 is excited as the antenna element, the conductive portion of the first printed board 45 is voltage (or current) coupled to the axis member 15 as a kind of parasitic element so as to enlarge an effective volume of the antenna device of the mobile communication terminal 4 and to increase the antenna gain.

The configuration shown in FIG. 13 may be modified in such a way that the conductive portion of the first printed board 45 is arranged close to the feed end of the antenna element. FIG. 14 shows an example of measurement of the radiation efficiency of the antenna element in a frequency range of digital terrestrial TV broadcasting (DTTB) for mobile terminals, in condition that the conductive portion of the first printed board 45 is close, or not close, to the open end or the feed end of the antenna element (an antenna element other than the axis member 15 has been used for the measurement). FIG. 14 has a horizontal axis representing frequencies (in a 470-770 megahertz (MHz) range) and a vertical axis representing the radiation efficiency (in decibel (dB)). Triangular plots shown in FIG. 14 denote measurement data in condition that both the open end and the feed end are arranged close to the conductive portion of the first printed board 45. Circular plots denote measurement data in condition that only the open end is arranged close to the conductive portion of the first printed board 45. Square plots denote measurement data in condition that only the feed end is arranged close to the conductive portion of the first printed board 45. Diamond plots denote measurement data in condition that none of the open end and the feed end is arranged close to the conductive portion of the first printed board 45.

Figure 14:
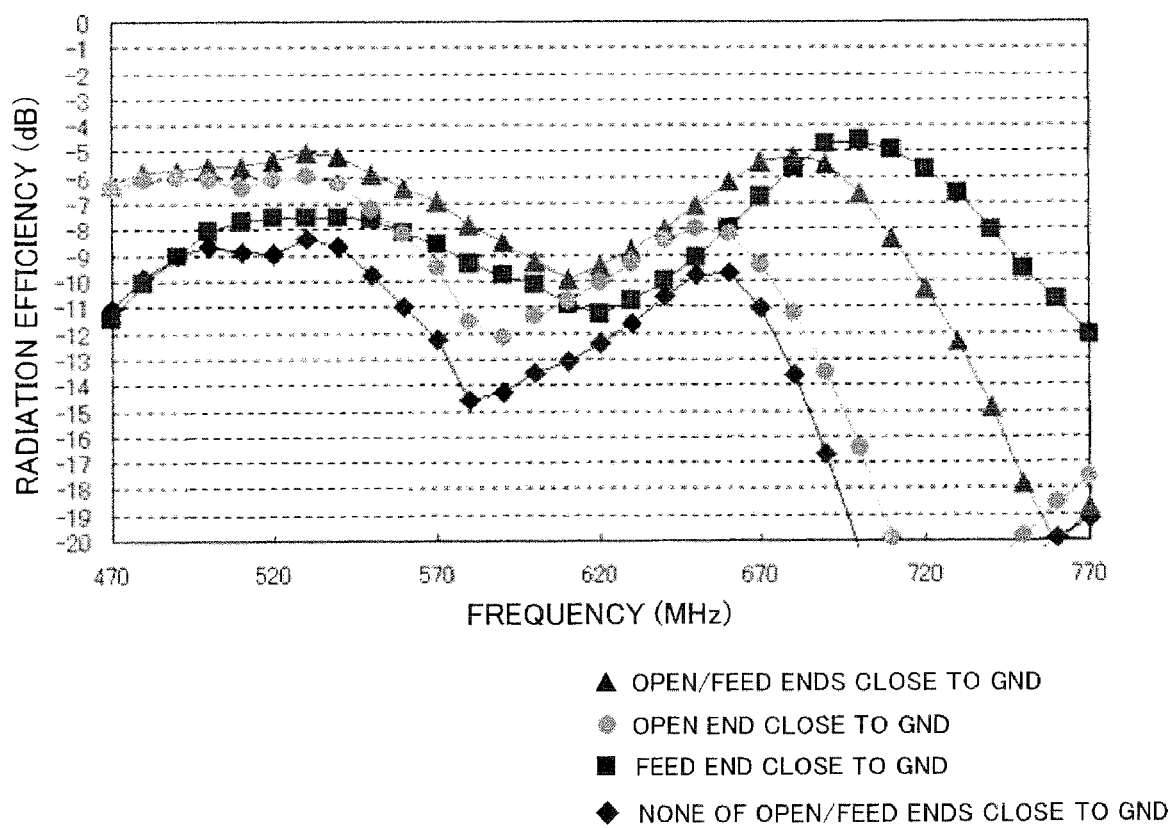
FIG. 14 shows an example of measurement of radiation efficiency of the mobile communication terminal of the second embodiment.

As shown in FIG. 14, in the lower frequency range around 520 MHz, it is contributing to the increased radiation efficiency to arrange the open end of the antenna element close to the conductive portion of the first printed board 45. In the higher frequency range around 670 MHz, it is contributing to the increased radiation efficiency to arrange the feed end of the antenna element close to the conductive portion of the first printed board 45.

Thus, in order that the antenna device for receiving DTTB is tuned to the lower frequency range, the mobile communication terminal 4 is configured as shown in FIG. 13 so that the antenna device is arranged close to one side of the hinge section 43 and coupled to the conductive portion of the first printed board 45. The mobile communication terminal 4 can satisfy the tuning requirement and can effectively use space of the other side of the hinge section 43 in parallel.

If at least a portion of the first housing section 41 is formed by conductive material a configuration in which the portion formed by the conductive material is arranged close to the axis member 15 can obtain an effect similar to that of the second embodiment.

According to the second embodiment of the present invention described above, the antenna element is coupled to the printed board included in the housing of the mobile communication terminal so that the space use efficiency and the antenna characteristic can be improved.

In the above description of the embodiments, the configurations, shapes and connections or positional relations of the mobile communication terminal, the hinge sections and the antenna devices, the shapes and the arrangements of other members, etc. are considered as exemplary only, and thus may be variously modified within the scope of the present invention.

The particular hardware or software implementation of the present invention may be varied while still remaining within the scope of the present invention. It is therefore to be understood that within the scope of the appended claims and their equivalents, the invention may be practiced otherwise than as specifically described herein.

What is claimed is:

1. A radio apparatus comprising: a first housing section; a second housing section rotatably connected to the first housing section, the second housing section including an antenna feed circuit and a ground circuit; and a hinge section comprising an axis member fixed to the second housing section and a bearing member fixed to the first housing section, the axis member being provided through the bearing member so as to form an axis of rotation of the second housing section with respect to the first housing section, the axis member having a conductive portion connected to the antenna feed circuit at a feed point; wherein the axis member is arranged such that the conductive portion of the axis member is at least partially exposed to outside of the bearing member; wherein a nonconductive surrounding member is arranged around the conductive portion of the axis member exposed to the outside of the bearing member; and wherein a conductive pattern is provided on the nonconductive surrounding member; wherein: a first antenna element including the axis member, and second and third antenna elements on a side of the second housing section of the hinge section are provided, the first antenna element and the second antenna element have inverted-L shapes directed in directions opposite to each other, and tips of the first antenna element and the second antenna element are arranged substantially perpendicular to the third antenna element.

2. The radio apparatus of claim 1, wherein the axis member is connected to the ground circuit.

3. The radio apparatus of claim 1, wherein the axis member is shaped so as to be connectable to the antenna feed circuit.

4. The radio apparatus of claim 1, wherein the conductive pattern is connected to the antenna feed circuit.

5. The radio apparatus of claim 1, wherein the first housing section includes a printed board having a conductive portion, and
   wherein the axis member and the printed board are relatively arranged such that the conductive portion of the axis member and the conductive portion of the printed board are positioned close to each other.

6. The radio apparatus of claim 1, wherein the first housing section includes a printed board having a conductive portion, and
   wherein the axis member and the printed board are relatively arranged such that an end of the axis member farther from the feed point and the conductive portion of the printed board are positioned close to each other.

7. The radio apparatus of claim 1, wherein the first housing section includes a printed board having a conductive portion, and
   wherein the axis member and the printed board are relatively arranged such that the feed point and the conductive portion of the printed board are positioned close to each other.

8. The radio apparatus of claim 1, wherein at least a portion of the first housing section comprises a conductive material, the conductive portion of the axis member being positioned close to the portion of the first housing section comprising the conductive material.

9. The radio apparatus of claim 1, wherein the exposed conductive portion of the axis member partially exposed to the outside of the bearing member is connected to the antenna feed circuit at one point and connected to the ground circuit at another point.

10. An antenna device adapted for a radio apparatus comprising a first housing section and a second housing section rotatably connected to each other, the second housing section having an antenna feed circuit and a ground circuit, the antenna device comprising: an antenna element comprising an axis member fixed to the second housing section, the axis member having a conductive portion connected to the antenna feed circuit at a feed point; and a bearing member fixed to the first housing section, the axis member being provided through the bearing member so as to form an axis of rotation of the second housing section with respect to the first housing section; wherein the axis member is arranged such that the conductive portion of the axis member is at least partially exposed to outside of the bearing member; wherein a nonconductive surrounding member is arranged around the conductive portion of the axis member exposed to the outside of the bearing member; and wherein a conductive pattern is provided on the nonconductive surrounding member; wherein: a first antenna element including the axis member, and second and third antenna elements on a side of the second housing section of the hinge section are provided, the first antenna element and the second antenna element have inverted-L shapes directed in directions opposite to each other, and tips of the first antenna element and the second antenna element are arranged substantially perpendicular to the third antenna element.

11. The antenna device of claim 10, wherein the axis member is connected to the ground circuit.

12. The antenna device of claim 10, wherein the axis member is shaped so as to be connectable to the antenna feed circuit.

13. The antenna device of claim 10, wherein the conductive pattern is connected to the antenna feed circuit.

14. The antenna device of claim 10, wherein the first housing section includes a printed board having a conductive portion, and
   wherein the axis member and the printed board are relatively arranged such that the conductive portion of the axis member and the conductive portion of the printed board are positioned close to each other.

15. The antenna device of claim 10, wherein the first housing section includes a printed board having a conductive portion, and
   the axis member and the printed board are relatively arranged such that an end of the axis member farther from the feed point and the conductive portion of the printed board are positioned close to each other.

16. The antenna device of claim 10, wherein the first housing section includes a printed board having a conductive portion, and
   the axis member and the printed board are relatively arranged such that the feed point and the conductive portion of the printed board are positioned close to each other.

17. The antenna device of claim 10, wherein at least a portion of the first housing section comprises conductive material, the conductive portion of the axis member being positioned close to the portion of the first housing section comprising the conductive material.

18. The antenna device of claim 10, wherein the exposed conductive portion of the axis member partially exposed to the outside of the bearing member is connected to the antenna feed circuit at one point and connected to the ground circuit at another point.

* * * * *